July 2, 1935.                E. W. SMITH                    2,006,844
            MACHINE FOR TURNING STORAGE BATTERY PLATES
              FROM HORIZONTAL TO VERTICAL POSITIONS
                    Filed Nov. 3, 1932        4 Sheets-Sheet 4
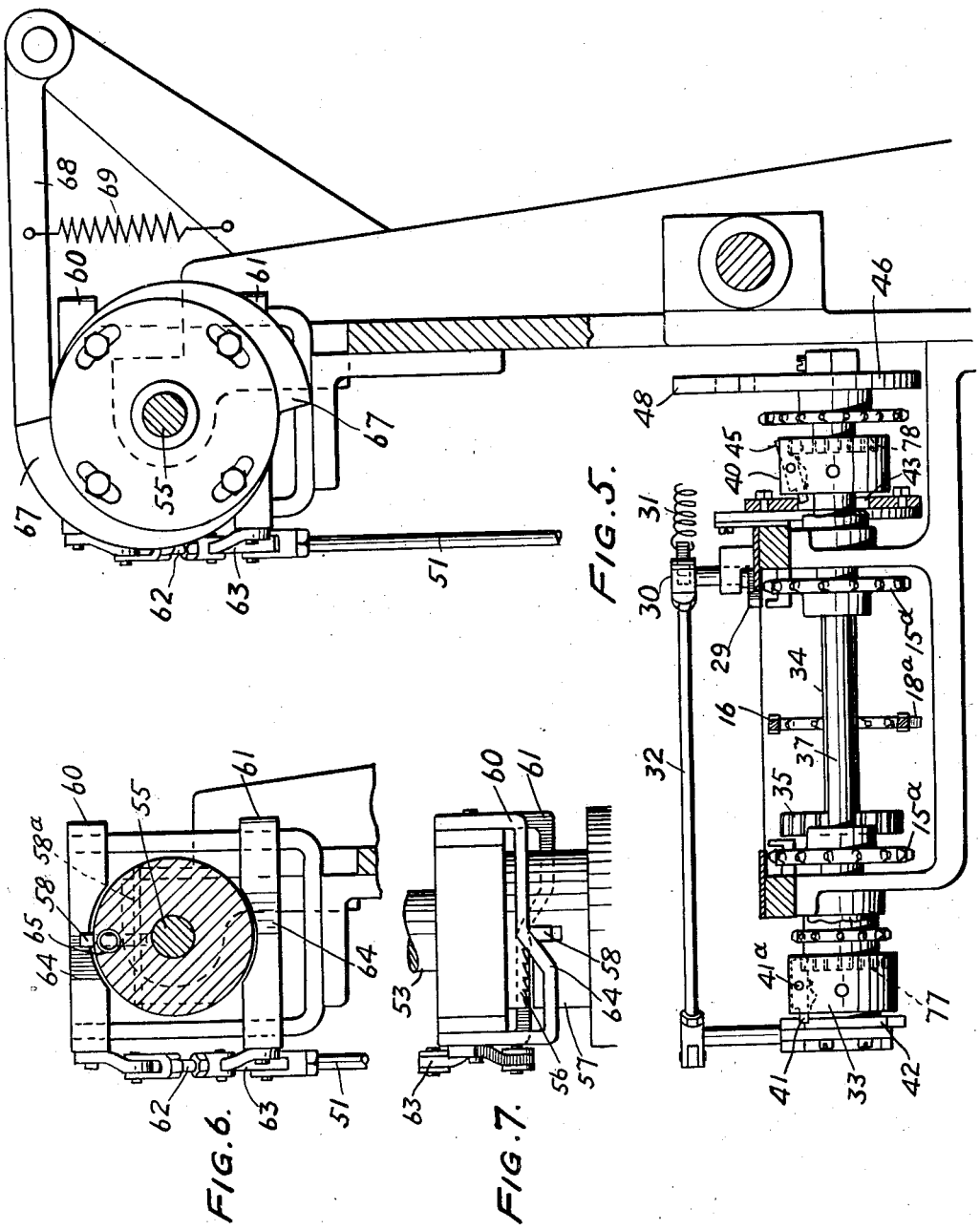
INVENTOR
Edward W. Smith
BY
Augustus B. Broughton
ATTORNEY.
WITNESS:
Robt R Kitchel Patented July 2, 1935

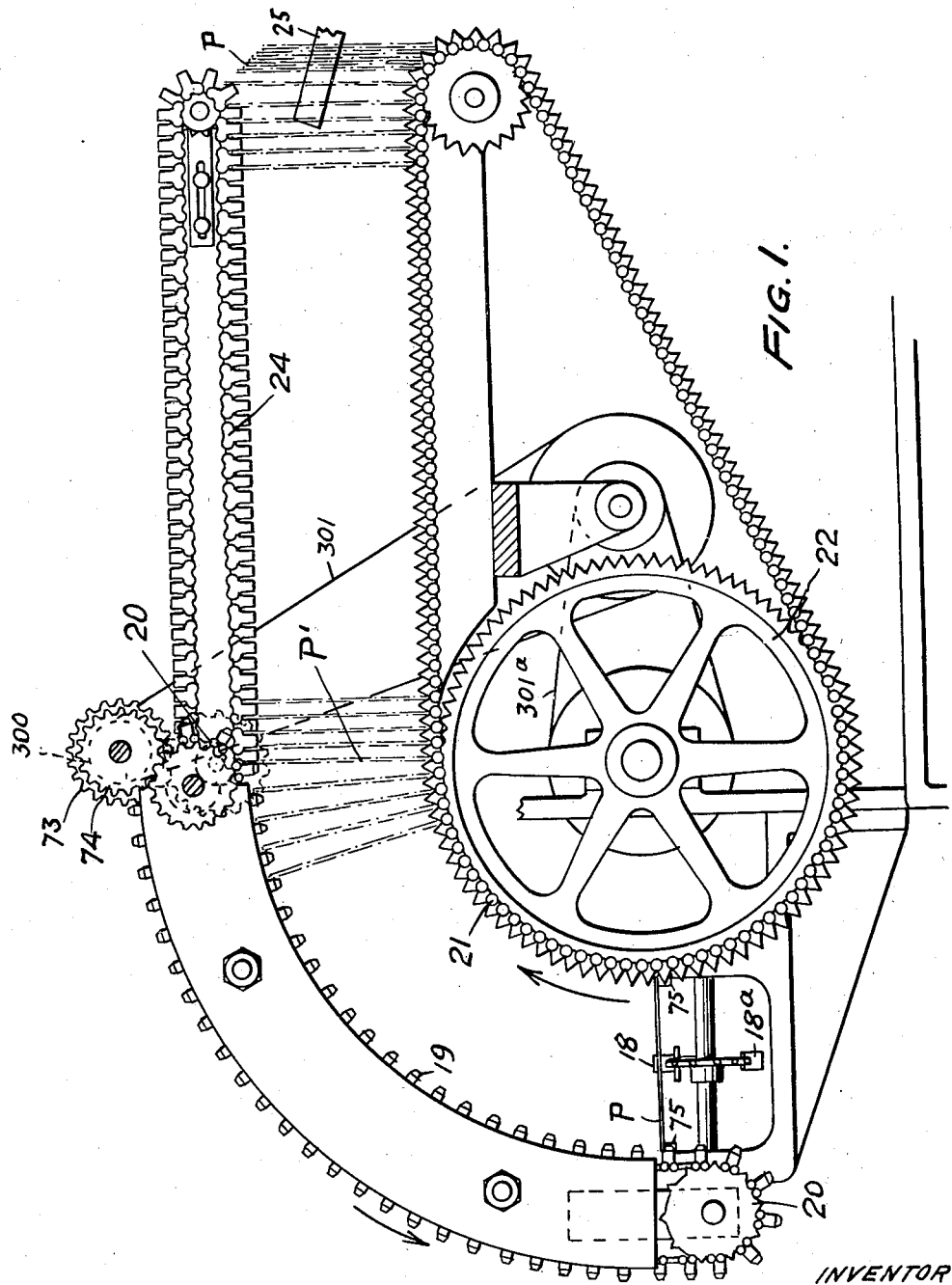

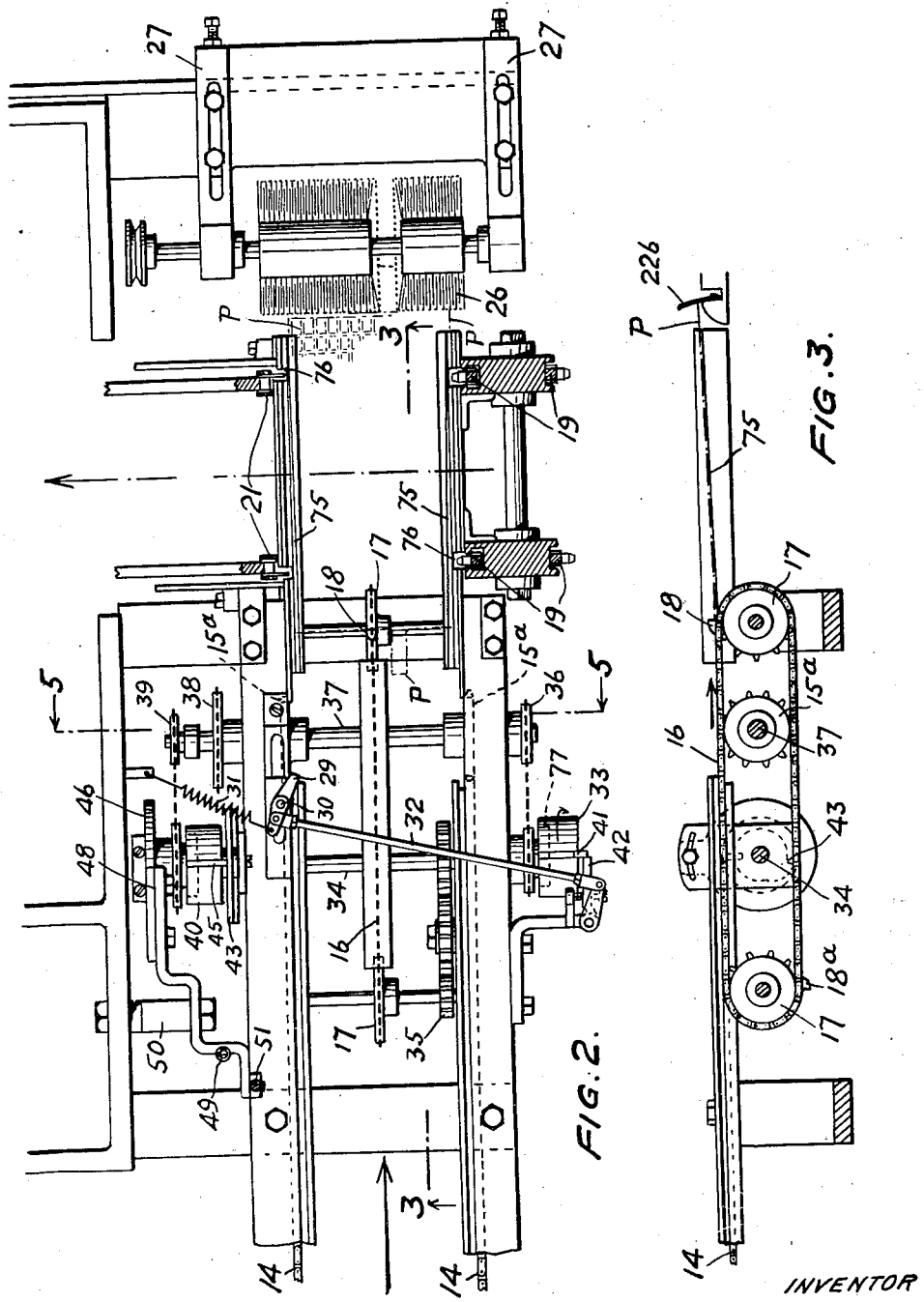

2,006,844

UNITED STATES PATENT OFFICE 2,006,844

MACHINE FOR TURNING STORAGE BATTERY PLATES FROM HORIZONTAL TO VERTICAL POSITIONS

Edward W. Smith, Philadelphia, Pa., assignor to The Electric Storage Battery Company, Philadelphia, Pa., a corporation of New Jersey Application November 3, 1932, Serial No. 641,036

8 Claims. (Cl. 198—21)

The subject matter of this invention constitutes an element of the combination described and claimed in an application Serial No. 641,035, filed November 3, 1932, for Process and apparatus for setting the paste of newly pasted storage battery plates filed by Clarence A. Hall and myself.

The principal object of the present invention is to provide an efficient, reliable and satisfactory machine for continuously receiving plates in horizontal position, turning them into vertical position, and delivering them in face to face relation at substantially right angles to the direction in which they were received.

The invention consists in the improvements to be presently described and finally claimed.

In the following description reference will be made to accompanying drawings forming part hereof and in which Figure 1 is a front view of the machine with parts omitted.

Fig. 2 is a top or plan view.

Fig. 3 is a sectional view on the line 3—3 of Fig. 2.

Fig. 5 is a transverse sectional view illustrating parts shown in Fig. 2 and taken on the line 5—5.

Fig. 6 is a view partly in section of a clutch mechanism hereinafter described, and Fig. 7 is a top or plan view of Fig. 6.

Figure 4:
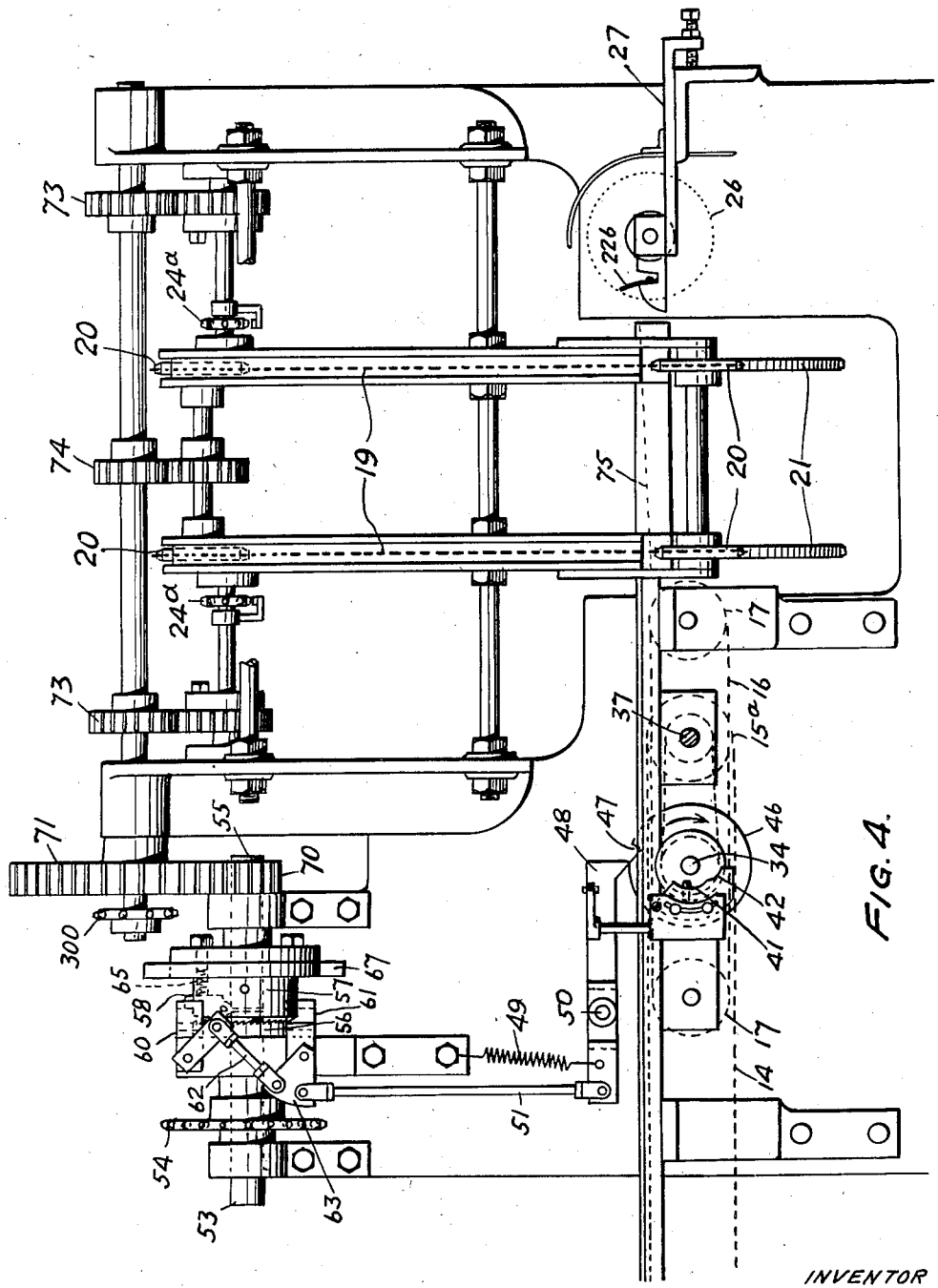
Fig. 4 is an end view.

Referring to Fig. 2, the plates are delivered onto the twin conveyor chains 14 of the lifting device. The conveyors 14 consist of two chains spaced apart so as to support the plates by their edges, only. The conveyors 14 operate between sprocket wheels of which one pair 15—a are shown, see Figs. 2 and 4, and from 15—a on, the plates are supported on rails 75. See Figs. 1, 2, 3 and 4. The conveyors 14 advance the plates until they are supported on the rails 75 and during the latter portion of its travel each plate engages with the pivoted trigger 29, Fig. 2, pivoted at 30 and returned to position, after tripping, by spring 31. This trigger, acting through rod 32 and levers, actuates a clutch 33 which in turn causes the sprocket chain 16 to move forward, and by means of one or the other lug 18 or 18—a, Fig. 3, to engage with the plate and push it forward on the rails 75 until it comes to a definite predetermined position with the front edge of the plate engaging with a rotating brush 26, Figs. 2 and 4.

Referring now especially to Figs. 2 and 1, a plate P is shown in dotted lines resting upon rails 75 and either at or approaching its final position thereon. Each of the rails 75 is provided with two notched openings 76, Fig. 2, and through each of these notches runs a conveyor chain, 19, on the front of the figure, and 21, on the back. Sprocket chain 19 is guided by a curved housing or guide so as to move in a circular path, parallel to sprocket chain 21; and works between two sprocket wheels 20, the upper one of which acts as driver. These conveyor chains are so spaced that their projecting teeth are separated by a space slightly less than the width of the plate, and the mechanism which operates them, to be described shortly, is such as to bring them periodically to rest, while a plate is being slid along the rails 75, in such position that their projecting teeth do not contact with the plate edges. As soon, however, as a plate has come to rest on rails 75 the sprocket chains 19 and 21 are caused to move forward, thus lifting the plate which has just been delivered, by the space of one tooth and coming to rest in position to allow another plate to enter between the next set of sprocket teeth. As successive plates are delivered, therefore to the rails 75, each one is raised one tooth at a time and with an angular motion which, by the time the plate has reached its upper limit, amounts to 90°, thus causing the plate to assume a vertical position, as shown at $P_1$, Fig. 1. It is to be noted that each of the sprocket chains 19 and 21 is in duplicate, as shown in Fig. 2, so that the plate rests at four points, two on the bottom edge and two at the upper edge.

Inasmuch as the plate is being subject to angular motion at the time it is lifted, the outside edge resting on the chain 19 is necessarily moving faster than the inside edge resting on the chain 21, this difference in speed also necessitating the sprocket tooth pitch being greater on the chain 19 than on chain 21. Since it is required to hold the plates in the vertical position from the point $P^1$ onward, a third pair of sprocket chains 24, having the same pitch as chains 21 is provided, driven by sprocket wheels 24—a, Fig. 1, which so cooperate with sprocket chain 19 that as the plates leave 19 they are simultaneously picked up by 24. From this point on, the plates with their lower edges resting on sprocket chain 21 and upper edges steadied by sprocket chain 24 are carried on in vertical side by side arrangement until they come to the end of the horizontal portion of the chains 24 and 21. Sprocket chains 21 and 24 may be extended to whatever length necessary, being supported, of course, by suitable rails which prevent them from sagging. At the end of these conveyor belts there are placed suitable rails 25 on which the plates are deposited still in vertical position and suspended from their lugs.

It is evident that for the successful operation of these various conveyors they must operate in proper unison, and mechanisms by which this is accomplished will now be described in more detail. The conveyor chains 14 are continually in motion, so as to receive plates as fast as they are placed upon them. The conveyor chain 16, however, which may be conveniently designated as a booster, is normally at rest with one of its dogs 18 in the position where it has delivered the last one of its plates upon rails 75, and the other dog 18—a out of the way, so as not to interfere with the next plate being delivered over the booster. The booster chain, by means of its sprocket wheel 17, left hand in Fig. 2, and the train of gear wheels 35, is operated from shaft 34, and the gear ratios are such that one revolution of shaft 34 will exactly correspond to a motion of the dogs between the positions 18—a and 18. Shaft 34 is controlled in its rotation by means of two clutches 33 and 40 which in turn are operated by chains and sprocket wheels 36 and 39, both the latter mounted upon a shaft 37 which latter shaft is kept in continuous motion by means of a motor or other drive and a chain running over sprocket wheel 38. The sprocket ratios are such that clutch 40 is running at a materially lower speed than clutch 33 for reasons which will be presently described. Both of the clutches 33 and 40 are of the self-releasing type, such as are frequently used on punch presses wherein the act of tripping the trigger causes the shaft to make a single revolution and come to rest, until the trigger is again operated. Referring especially to Figs. 5 and 2, the clutch 33 is controlled by means of the trigger 29, rod 32 and latch 42 which engages with the tongue 41 pivoted at 41—a. When the trigger 29 is operated by an oncoming plate, the latch 42 pivoted about a vertical axis is moved out of engagement with tongue 41 allowing the latter to engage in teeth of the continually rotating toothed wheel 77 which thereupon causes clutch 33 to revolve until tongue 41 again engages with latch 42 so as to throw tongue 41 out of engagement with a tooth on wheel 77. At this point the shaft 34 would come to rest were it not for the second clutch 40 operating at a lower speed than 33. This clutch also is provided with a pivoted tongue 45 and ratchet wheel 78 Fig. 5, and the relative angular position of the release latches 42 and 43 is such that at the time when tongue 41 has been thrown out of engagement, tongue 45 is allowed to remain in engagement with its ratchet teeth until the shaft 34 has turned at the lower speed a number of degrees farther. It is finally allowed to come to rest when the tongue 45 engages with a projecting part of the fixed latch 43 where it remains at rest until trigger 29 is again operated. The effect of these two clutches 33 and 40 is to give the booster chain a rapid motion so as to advance the plate quickly until near its final position, then allow it to slow down and advance slowly to its ultimate position, thus bringing the plate to rest accurately and with a minimum of shock at the time of stoppage when the forward lug of the plate engages with flexible stop 226, Fig. 3.

Referring again to Figures 4 and 2, it is to be noted that there is a cam wheel 46 which is fastened directly to shaft 34 and provided with a notch 47. Adjacent to the notch 47 is a second trigger or cam follower 48 pivoted at 50 and spring pressed at 49 and communicating through rod 51, pivotal lever 63, and link 62 to another clutch mechanism designated by 56 and 57. The continually moving member of this clutch is mounted on shaft 53 and is a toothed wheel 56 driven by means of a sprocket wheel 54 connected to a motor or other suitable driver. The intermittent member of the clutch is piece 57 which is connected directly by means of a shaft 55 to pinion 70. The operating tongue or dog of the clutch is pressed by spring 65 and is pivoted at 58—a and is designated at 58, see Figs. 6 and 7, and is thrown out of engagement by the twin latches 60 and 61, having projecting operating parts 64, both of which operate simultaneously from cam lever 48.

As an additional detail or refinement, clutch 57 is provided with a non-chattering mechanism shown especially in Fig. 5. Clutches of this general nature, particularly when run at low speed, are subject to chattering when in the released position, due to the fact that the driven member may move just barely far enough to cause the tongue to disengage with the ratchet teeth, but not far enough to clear the ratchet teeth entirely. In the case illustrated, the driven member of the clutch is provided with a double cam 67 and a lever 68 operated upon by a spring 69 and engaging therewith in such manner that after the tongue has been released from engagement with the ratchet teeth, the lever 68 acting on the inclined cam faces, moves the clutch member slightly further, and thus throws the tongue in such position that it entirely clears the teeth on driven member 56.

Sprocket pinion 70 Fig. 4 engaging with gear wheel 71 communicates motion to the gear wheels 73 and 74 which in turn, with their gears, operate respectively the two sprocket wheels 24—a that run sprocket chain 24 and sprocket wheels 20 which operate the conveyor chains 19. Also through means of sprocket wheel 300 sprocket chains 301 and 301—a, Figs. 1 and 4, the motion of gear wheel 71 is communicated to sprocket wheels 22 which carry sprocket chains 21. By suitable gear ratios, the driven clutch member 56 communicates to each of the three chains 19, 20 and 24 a forward movement of exactly one tooth each time the trigger 48 is tripped.

In the illustrations it should be noted the various gear ratios are such that a half revolution of shaft 55 corresponds to a forward motion of one pitch of the various sprocket chains 19, 21 and 24. It is for this reason that clutch 56—57 is provided with two release latches, 60 and 61 which cause shaft 55 to make a half revolution each time trigger 58 is operated. The use of this clutch with a 180° motion rather than the usual form, which makes a complete revolution between stops, is merely a matter of convenience in design.

Every time, then, that a plate is delivered to the booster chain 18 and after the booster chain has begun to move forward by an amount which may be adjusted, the cam wheel 46 presents to trigger 48 the notch 47 allowing trigger 48 to drop, which, in turn, releases one or the other latches 60 and 61, causing clutch 57 to make a half revolution, and thus advancing by one tooth all the plates already delivered to the chains 19, 21 and 24, and leaving sprocket teeth ready for the reception of the next plate to be delivered along rails 75.

It may be noted that in order to attain proper speed, the timing of cam wheel 46 is such as to set in motion the various sprocket wheels and chains 19 and 21, etc., before the plate has come to rest against the spring stop 226 and in order to avoid the plate striking against one of the sprocket pins on either chain 19 or 21 during this motion, the rails 75 are inclined slightly upwards, as shown in Figs. 3 and 4.

When the plates are delivered from the pasting machine, the forward edge always carries with it a considerable amount of paste on the front edge which would be very objectionable in the subsequent handling and final assembling of the plate. The rotating brush 26 is provided for removing this adhering paste which it does by virtue of the fact that it is kept in continual rotation and at such position, as shown in Figs. 2 and 4, that the front edge of the plate engages with it for a moment as it comes to rest on rails 75. The brush is mounted on adjustable brackets 27 and is shaped so as to correspond with the profile of the lug and front edge of the plate, and it is thus suited to free the whole front edge of the plate from any adhering paste.

When the plates finally reach the end of the sprocket chains 21 and 24, they are released by the chains and deposited with their lugs resting upon suitable rails or bars 25. At this point the space between adjacent plates is naturally closed up and the plates become piled or stacked upon the rails 25 with their surfaces touching each other, whence they may be manually removed in bulk and placed in suitable storage receptacles.

It will be readily understood that this mechanism is adapted to receive freshly pasted plates as delivered in horizontal position by a pasting machine, and to stack them closely in vertical position so they may be removed in bulk; also that it is adapted to perform this function in conjunction with a continuous setting or drying operation, which may take place either before or after the plates have been raised to the vertical position.

To avoid unnecessary verbiage in reciting the claims, I propose to speak of the various sprocket chains 19, 21 and 24 in the singular, although actually as constructed each of these chains exist in pairs. Also, I have spoken of the mechanism throughout as applying to the handling of storage battery plates, since it was for that purpose especially designed. I do not, however, wish to limit its use to the handling of storage battery plates, only, as it is applicable to the lifting of other platelike pieces.

I claim:

1. A machine of the type recited consisting of two cooperating sprocket chains having teeth projecting toward each other to maintain articles carried thereby in spaced relation, a sprocket around which one chain operates in a convex position, a curved track concentric with the first-mentioned chain and around which the other chain operates; the two chains together adapted to receive plates in a horizontal position and to lift and turn plates until they have attained a vertical position, and a horizontal run of conveyor chains adapted to convey said plates in horizontal direction.

2. A machine of the type recited having three cooperating sprocket chains, one of which operates in a circular arc, and along a straight run; another of which operates in a circular arc concentric with that of the first and at a substantially equal rotary speed, and the third of which operates in a straight run parallel to that of the first chain, the whole adapted to receive plates in a horizontal position and, said chains having opposed co-ordinating projecting pins, to raise said plates and deliver them in approximately vertical face to face relation and in horizontal motion.

3. A machine of the type recited having rails suited to receive storage battery plates in horizontal position, means for delivering the plates along said rails, resting upon their edges; a booster for advancing the plates along said rails; opposed cooperating sprocket chains working in concentric arcs adapted to lift plates from said rails into a vertical position; and control mechanism, adapted to be operated by each plate as received, and causing booster to advance said plate, and sprocket chains to lift it, in proper unison as described.

4. In a machine of class specified, a booster, an automatic stop clutch for setting the booster in motion, a trigger which is operated by an advancing plate and which is adapted to control the clutch, a pair of concentric chains adapted to receive plates delivered by said booster and an automatic stop clutch operated by and in conjunction with said booster and adapted to cause said concentric chains to advance by stages of one tooth at a time to raise and deliver plate into a vertical position.

5. In a machine of the class recited a mechanism consisting of a pair of rails, a booster arranged to deliver plates as received by it in the horizontal position along the pair of rails, two cooperating clutches of automatic release type, the first of which causes relatively rapid, the second relatively slow motion, and adapted to operate the booster, and two cooperating concentric chains to which the booster delivers the plates.

6. In a machine of the type described, the combination of two horizontal conveyors arranged at different levels and at substantially right angles to each other, delivering rails at the exit of the high level conveyor, rails onto which the low level conveyor delivers, a conveyor operating through notches in the last mentioned rails, means for guiding the last mentioned conveyor in the arc of a circle from the low level to the high level conveyors, and mechanism for operating the said conveyors.

7. In a machine of the type described a pair of horizontal rails, a conveyor arranged to work intermittently, and to deliver plates onto said rails, a twin conveyor working in a circular arc at right angles to and intersecting said rails, a third conveyor disposed in horizontal direction at a different level from and at right angles to said first conveyor and constituting a continuation of said twin conveyor; terminal rails at the end of said last mentioned horizontal conveyor, and means for operating said conveyors in proper unison for receiving plates in horizontal position, raising them to and transferring them in a vertical position, and finally stacking them face to face on said terminal rails, as set forth.

8. In a machine of the class recited a mechanism consisting of a pair of rails, a booster arranged to deliver plates as received by it in the horizontal position, along said pair of rails, a clutch adapted to be tripped by said plates, and mechanism which is in turn set in motion under the control of said clutch to give said booster a rapid motion, followed by a slow gradual one prior to its again coming to rest.

EDWARD W. SMITH.